Aug. 16, 1955  H. A. ROCKEL  2,715,429
DEVICE FOR APPLYING TIRE CHAINS
Filed Oct. 23, 1953
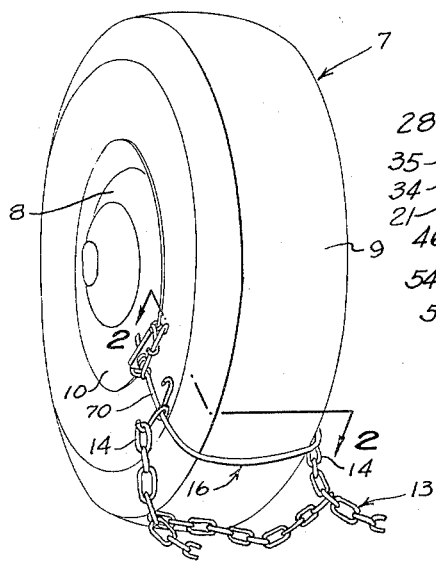
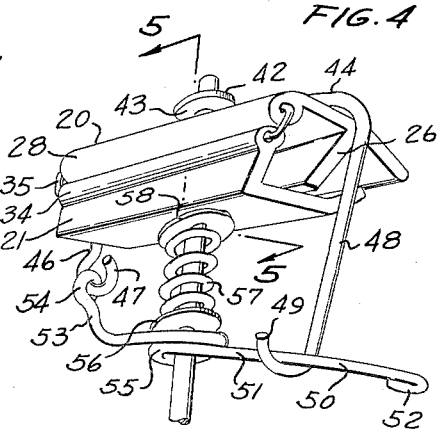
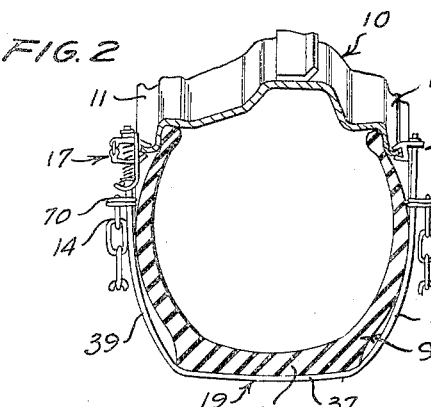
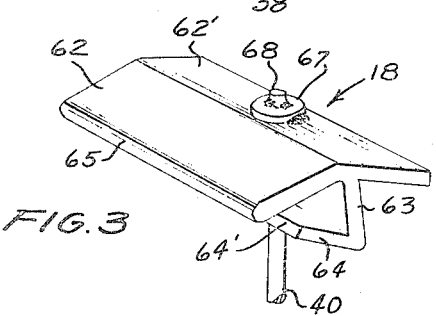
INVENTOR.
HENRY A. ROCKEL
BY
McMorrow, Berman + Davidson
ATTORNEYS

United States Patent Office 2,715,429
Patented Aug. 16, 1955

2,715,429

DEVICE FOR APPLYING TIRE CHAINS

Henry A. Rockel, Allentown, Pa.

Application October 23, 1953, Serial No. 388,023

5 Claims. (Cl. 152—213)

This invention relates to an improved device for applying anti-skid chains to vehicle wheels.

The primary object of the invention is to provide a novel and more efficient and practical device which renders the application of tire chains to vehicle wheels easier, quicker, and with less likelihood of soiling the hands and clothes, the said device being capable of being made in a rugged, serviceable, and attractive form at relatively low cost.

Other important objects and advantageous features of the invention will be apparent from the following description and the accompanying drawings wherein, for purposes of illustration only, a specific form of the invention is set forth in detail.

In the drawings:

Figure 1 is a perspective view of a pneumatic tired vehicle wheel showing a device according to the invention applied thereto;

Figure 2 is an enlarged transverse section taken on the line 2—2 of Figure 1;

Figure 3 is an enlarged perspective view of the inboard clip;

Figure 4 is an enlarged perspective view of the outboard clamp showing the same in closed position;

Figure 5 is a transverse vertical section taken on the line 5—5 of Figure 4; and Figure 6 is an enlarged perspective view of the clamp, showing the same in open position.

Referring in detail to the drawings, wherein like numerals designate like parts throughout the several views, the numeral 7 generally designates a vehicle wheel involving a wheel body 8 having thereon a pneumatic tire 9 seated in a drop-center rim 10 which terminates at its opposite side edges in outboard and inboard flanges 11 and 12, respectively, which curve laterally outwardly and radially outwardly with respect to the wheel body 8 and the tire 9. The anti-skid chain 13 shown in Figures 1 and 2, is of usual construction and involves terminal links 14, 14 on the ends of its longitudinal chain elements.

The illustrated chain applying device, generally designated 16, comprises an outboard rim flange clamp 17, an inboard rim flange clip 18, and a spring tire-embracing yoke 19 which carries the clamp 17 and clip 18.

The clamp 17 comprises an inner jaw 20 and an outer jaw 21. The inner jaw 20 is preferably of one piece of rigid metal and involves an elongated generally rectangular plate composed of two generally similar longitudinal portions 22 and 22' which are in planes positioned at a slight angle to each other, so that the outer free longitudinal edge 23 of the plate portion 22' can enter and engage in the concavity 24 behind the free edge 25 of the outboard rim flange 11 of the wheel rim 10, as indicated in Figure 5. A preferably integral fulcrum ridge or flange 26 extends along the jaw 20 at the juncture of the plate portions 22, 22' on the side of the jaw 20 facing the outer jaw 21. The flange 26 has a free longitudinal edge 27 which is arranged to bear tiltably upon the side of the outer jaw 21 which faces the inner jaw 20.

The outer longitudinal edge of the plate portion 22 has a tubular enlargement providing a hinge barrel 28, and the plate portion 22 is further provided with a centered hole 29 which passes a part of the tire engaging yoke 19, as hereinafter described.

The outer jaw 21, also preferably of rigid metal, is of approximately the same length but slightly narrower than the inner jaw 20, and involves a middle plate portion 30, preferably integral at its opposite longitudinal edges with a right angular plate portion 31 and a plate portion 32 which is slightly angulated toward the inner jaw 21 and has a longitudinal terminal edge 33 which is arranged to engage the outer side of the outboard rim flange 11, as shown in Figure 5, in opposition to the inner jaw 20.

The free edge of the right angular plate portion 31 has thereon a longitudinal tubular enlargement 34 serving as a hinge barrel. A hinge loop 35 is engaged through the hinge barrels 28 and 34, whereby the jaws 20 and 21 are relatively loosely hinged together in a facing and coextensive relation to each other. The middle plate portion 30 has a central hole 36 which passes a part of the tire engaging yoke 19.

The tire engaging or embracing yoke 19 is preferably of heavy spring wire and involves a substantially straight bight portion 37 whose length is preferably only slightly greater than the width of the tread 38 of the tire 9, and two similar slightly bowed outboard and inboard arms 39 and 40, respectively.

The outboard yoke arm 39 passes through the holes 36' and 29 of the outer and inner jaws 21 and 20, respectively, of the rim clamp 17 and has an enlarged or swaged free end 41 which is in retaining relation to a washer 42 on the arm 39, the washer 42 being in retaining relation to a single coil or loop 43 loosely circumposed on the arm 39 between the washer 42 and the inner side of the inner jaw 20.

The coil 43 is part of and is located intermediate the ends of a relatively stationary clamping arm 44, which is preferably composed of a single length of heavy rigid wire, and includes a straight intermediate or middle portion 45, a right angular end portion 46 terminating in an eye 47, and a right angular hook portion 48 terminating in an open hook or catch 49.

A swingable clamping arm 50 includes a relatively straight portion 51 terminating at one end in a closed loop 52 and at its other end in a right angular portion 53 terminating in an eye 54 engaged through and swingably secured to the eye 47. The straight portion 51 has a single coil 55 at a point near the right angular portion 53 which is circumposd on the yoke area 39 at the outer side of the outer jaw 21. Circumposed on the yoke arm 39 between the coil 55 and the adjacent side of the outer jaw 21 are a washer 56, a helical spring 57, and another washer 58 bearing directly against the outer jaw 21.

Another helical spring 59 is circumposed on the yoke arm 39 between the two jaws 20 and 21 and normally acts to yieldably spread these jaws apart, when the swingable clamping arm 44 is disengaged from the catch hook 49, as shown in Figure 6, and which is slightly compressed by the jaws when the clamping arm 44 is engaged with the hook 49, as shown in Figures 4 and 5. When the clamping arm 50 is engaged with the hook 49 in the closed position of the clamp 17, the helical spring 57 is compressed, as shown in Figures 4 and 5, and the free edge 27 of the fulcrum flange 26 of the inner jaw 20 bears against the middle portion 30 of the outer jaw 21 at the side of the spring 59 adjacent to the jaw portion 32, where the fulcrum flange 26 is cut out to accommodate the spring 59, as indicated at 60 in Figure 5.

On the inboard arm 40 of the yoke 19 is mounted the inboard clip 18, shown in detail in Figure 3. The clip 18 resembles the inner jaw 20 of the clamp 17, and includes angulated plate portions 62 and 62', a central longitudinal fulcrum flange 63 which terminates in a flange 64 which is angulated toward the plate portion 62 and has a free edge 64' terminating in spaced relation to the plate portion 62. The free longitudinal edge 65 of the plate portion 62 is preferably rounded and is arranged to engage in the concavity 24 of the inboard tire rim flange 12 in opposition to the engagement of the free edge 64 of the flange 63 with the opposite side of this rim flange. The plate portion 62' is provided with a centralized hole which passes the yoke arm 40, and a washer 67 is welded or sidewise secured to the terminal end 68 of the yoke arm 40 to prevent the clip 18 from being separated from the yoke.

Both the outboard and inboard yoke arms 39 and 40, respectively, are provided with double opposed chain hooks 70 on which are to be hooked the terminal links 14, 14 of a tire chain 13.

With the wheel 7 jacked off the ground, the chain 13 is merely placed in line with the wheel 7 and the wheel rotated by hand in a direction to train the chain around the tire 9, the device 16 having been installed by first engaging the clip 18 with the inboard rim flange 12, engaging the yoke 19 simultaneously around the tire 9, and then engaging the clamp 17 on the outboard rim flange 11.

In the event that the chain 13 is to be applied with the wheel 7 on the ground, the same procedure is followed except that the chain 13 is laid out upon the ground behind the wheel and the vehicle is moved in the proper direction to wind the chain 13 in the tire 9. In either case, the usual chain connectors (not shown) are connected in the usual way as the terminal links 14, 14 are disengaged from the hooks 70.

What is claimed is:

1. In a device for applying a tire chain to a vehicle wheel having a rim including an outboard rim flange and an inboard rim flange and a tire on the rim, a tire embracing spring yoke having a bight portion for engaging the tread of a tire and outboard and inboard arms for engaging the outboard and inboard sides of the tire, a spring clamp mounted on the outboard yoke arm and adapted to be clamped on the outboard rim flange, a clip mounted on the inboard yoke arm and adapted to be engaged over the inboard rim flange, and chain hooks on said outboard and inboard yoke arms with which terminal links of a tire chain are adapted to be engaged, said clamp comprising opposed outer and inner jaws, means hinging the jaws together to swing toward and away from each other for engaging and disengaging from opposite sides of the outboard rim flange, first spring means on said outboard yoke arm tensioning the jaws away from each other, second spring means on said outboard yoke arm, a relatively stationary clamping arm and a swingable clamping arm mounted on said outboard yoke arm, said stationary clamping arm being engaged with a side of one of the jaws remote from the other jaw and said swingable clamping arm being positioned at the side of said other jaw remote from said one jaw, said second spring means being positioned between said swingable clamping arm and the remote side of said other jaw, said swingable clamping arm being arranged to be swung toward said other jaw so as to compress said second spring means and close the jaws together against the resistance of said first spring means, and a catch hook on said stationary clamping arm with which said swingable clamping arm is engageable to hold the jaws in clamping relation to the opposite sides of the outboard rim flange.

2. In a device for applying a tire chain to a vehicle wheel having a rim including an outboard rim flange and an inboard rim flange and a tire on the rim, a tire embracing spring yoke having a bight portion for engaging the tread of a tire and outboard and inboard arms for engaging the outboard and inboard sides of the tire, a spring clamp mounted on the outboard yoke arm and adapted to be clamped on the outboard rim flange, a clip mounted on the inboard yoke arm and adapted to be engaged over the inboard rim flange, and chain hooks on said outboard and inboard yoke arms with which terminal links of a tire chain are adapted to be engaged, said clamp comprising opposed outer and inner jaws, means hinging the jaws together to swing toward and away from each other for engaging and disengaging from opposite sides of the outboard rim flange, first spring means on said outboard yoke arm tensioning the jaws away from each other, second spring means on said outboard yoke arm, a relatively stationary clamping arm and a swingable clamping arm mounted on said outboard yoke arm, said stationary clamping arm being engaged with a side of one of the jaws remote from the other jaw and said swingable clamping arm being positioned at the side of said other jaw remote from said one jaw, said second spring means being positioned between said swingable clamping arm and the remote side of said other jaw, said swingable clamping arm being arranged to be swung toward said other jaw so as to compress said second spring means and close the jaws together against the resistance of said first spring means, and a catch hook on said stationary clamping arm with which said swingable clamping arm is engageable to hold the jaws in clamping relation to the opposite sides of the outboard rim flange, said swingable clamping arm having a free end arranged to engage said catch hook, another end swingably connected to a portion of said stationary clamping arm, and an intermediate portion supportably engaging said outboard yoke arm.

3. In a tire chain applying device, a U-shaped spring yoke having a bight portion and arms, said arms having free terminal ends and said yoke being relatively rigid and of limited flexibility, a clamp mounted on one of said free ends and a clip mounted on the other free end, said clip having fixed opposed jaws for engaging opposite sides of a wheel rim flange, said clamp comprising a pair of movable opposed jaws slidably mounted on said one free end for movement toward each other for engaging opposite sides of another wheel rim flange and away from each other for disengagement therewith, and releasable clamping means for said clamp comprising a relatively stationary clamping arm having a hook, and a swingable clamping arm mounted on the free end of the associated yoke arm and pivoted to said stationary arm, said movable jaws having outer sides and inner facing sides, said clamping arms lying along the outer sides of the movable jaws, said swingable clamping arm being arranged to be swung toward said stationary clamping arm so as to compress the clamping jaws together and having a free end portion engageable with the hook on the stationary clamping arm to maintain the movable jaws in compressed position.

4. In a tire chain applying device, a U-shaped spring yoke having a bight portion and arms, said arms having free terminal ends and said yoke being relatively rigid and of limited flexibility, a clamp mounted on one of said free ends and a clip mounted on the other free end, said clip having fixed opposed jaws for engaging opposite sides of a wheel rim flange, said clamp comprising a pair of movable opposed jaws slidably mounted on said one free end for movement toward each other for engaging opposite sides of another wheel rim flange and away from each other for disengagement therewith, and releasably clamping means for said clamp comprising a relatively stationary clamping arm having a hook, and a swingable clamping arm mounted on the free end of the associated yoke arm and pivoted to said stationary arm, said movable jaws having outer sides and inner facing sides, said clamping arms lying along the outer sides of the movable jaws, said swingable clamping arm being arranged to be swung toward said stationary clamping arm so as to compress the clamping jaws together and having a free end portion engageable with the hook on the stationary clamping arm to maintain the movable jaws in compressed position, first spring means mounted on the associated free end and compressed between the stationary and movable jaws and urging the stationary and movable jaws away from each other to separate the stationary and movable jaws when said free end portion of the swingable clamping arm is released from said hook.

5. In a tire chain applying device, a U-shaped spring yoke having a bight portion and arms, said arms having free terminal ends and said yoke being relatively rigid and of limited flexibility, a clamp mounted on one of said free ends and a clip mounted on the other free end, said clip having fixed opposed jaws for engaging opposite sides of a wheel rim flange, said clamp comprising a pair of movable opposed jaws slidably mounted on said one free end for movement toward each other for engaging opposite sides of another wheel rim flange and away from each other for disengagement therewith, and releasable clamping means for said clamp comprising a relatively stationary clamping arm having a hook, and a swingable clamping arm mounted on the free end of the associated yoke arm and pivoted to said stationary arm, said movable jaws having outer sides and inner facing sides, said clamping arms lying along the outer sides of the movable jaws, said swingable clamping arm being arranged to be swung toward said stationary clamping arm so as to compress the clamping jaws together and having a free end portion engageable with the hook on the stationary clamping arm to maintain the movable jaws in compressed position, first spring means mounted on the associated free end and compressed between the stationary and movable jaws and urging the stationary and movable jaws away from each other to separate the stationary and movable jaws when said free end portion of the swingable clamping arm is released from said hook, and second spring means mounted on said associated free end at the outer side of one of said movable jaws, said second spring means being compressed between said swingable clamping arm and said one jaw.

References Cited in the file of this patent

UNITED STATES PATENTS

| | | |
|---|---|---|
| 1,405,672 | Davis | Feb. 7, 1922 |
| 2,204,886 | Devlin | June 18, 1940 |
| 2,484,714 | Kapp | Oct. 11, 1949 |
| 2,507,376 | Klein | May 9, 1950 |